US012444551B2

(12) United States Patent
Chen et al.

(10) Patent No.: US 12,444,551 B2
(45) Date of Patent: Oct. 14, 2025

(54) SLIDING BLOCK—MICRO-SWITCH ASSEMBLY FOR CIRCUIT INTERRUPTERS

(71) Applicant: Ze Chen, Yueqing (CN)

(72) Inventors: Ze Chen, Yueqing (CN); Gui Chen, Wenzhou (CN)

(73) Assignee: Ze Chen, Yueqing (CN)

( * ) Notice: Subject to any disclaimer, the term of this patent is extended or adjusted under 35 U.S.C. 154(b) by 486 days.

(21) Appl. No.: 17/966,828

(22) Filed: Oct. 15, 2022

(65) Prior Publication Data

US 2023/0124082 A1 Apr. 20, 2023

Related U.S. Application Data

(60) Provisional application No. 63/256,310, filed on Oct. 15, 2021.

(51) Int. Cl.
*H01H 3/02* (2006.01)
*H01H 9/02* (2006.01)

(52) U.S. Cl.
CPC ................ *H01H 3/02* (2013.01); *H01H 9/02* (2013.01)

(58) Field of Classification Search
CPC ........ H01H 3/02; H01H 9/02; H01H 71/2463; H01H 71/58; H01H 71/62; H01H 83/04
USPC .......................................... 361/93.4; 200/318
See application file for complete search history.

(56) References Cited

U.S. PATENT DOCUMENTS

2006/0198071 A1* 9/2006 Campolo ............. H02H 11/002 361/72
2007/0086127 A1* 4/2007 Huang ................... H01H 83/04 361/42
2007/0211397 A1* 9/2007 Sokolow ................ H01R 24/78 361/42
2008/0211607 A1* 9/2008 Moreinis ............ H01R 13/7135 335/15
2018/0083436 A1* 3/2018 Chen ........................ H02H 3/16

* cited by examiner

*Primary Examiner* — Sreeya Sreevatsa
(74) *Attorney, Agent, or Firm* — Mei & Mark LLP

(57) ABSTRACT

In one example, a sliding block module is provided. The sliding block module may include a block seat, a sliding block, and a first arm assembly. The sliding block may be at least partially disposed within the block seat, and may be configured to move vertically therein. The block seat and the first arm assembly may form a first hinge upon which the first arm assembly may rotate. The first arm assembly may include a first conductive component. The first arm assembly may be biased to rotate inwardly toward the block seat and the sliding block. The sliding block module may be utilized as part of mechanical trip/reset assembly of, for example, a circuit interrupter.

20 Claims, 7 Drawing Sheets

SLIDING BLOCK—MICRO-SWITCH ASSEMBLY FOR CIRCUIT INTERRUPTERS

This application claim priority to U.S. Provisional Patent Application No. 63/256,310, filed on Oct. 15, 2021, the disclosure of which is herein incorporated by reference in its entirety.

TECHNICAL FIELD

The present disclosure relates to apparatuses, mechanisms, circuits, systems, and methods to enhance functionality and safety of Circuit Interrupter devices, including, but not limited to, GFCIs, AFCIs, and HCIs. The present disclosure also pertains to Circuit Interrupter devices.

BACKGROUND

Conventional earth current leakage circuit breakers and over-current fuses are commonly deployed to prevent injuries to people and property from dangerous conditions resulting from, for example, current leakages or fires resulting from electrical faults such as current arcs or severe current leakages. Such devices typically detect the occurrence of certain types of electrical faults to prevent harm to persons and property.

Ground faults may be commonly defined as the existence of a current imbalance between the supply and the return path wherein an undesirable and significant amount of the unreturned current is leaking, or passing through an object—for example a human body, to the ground. Notably, the passage of electrical current through the human body may cause injury or even death. Circuit Interrupters that detect and respond to ground faults may be referred to as GFCIs.

A current arc is typically caused by a current surging over separated or poorly contacting electrical surfaces within electrical equipment, for example, in its power cord or in an electrical device itself; or within damaged electrical wiring, such as, within the walls of a building. Current arc electrical faults may be defined as current through ionized gas between the two (e.g., supply-side and load-side) separated or poorly contacting electrical surfaces. Such current arcs are often characterized by sparking and extremely high heat, and as a result can cause electrical fires. For example, electrical fires may start when the heat and/or sparking of a current arc causes insulating material or construction material in the vicinity of the electrical fault to combust. Current arc-caused electrical fires may damage property or even endanger human life. Circuit Interrupters that detect and respond to arc faults may be referred to as AFCIs.

Combination devices that protect users and electrical appliances from both ground faults and arc faults may be referred to as HCI (Hybrid Circuit Interrupters).

It is considered important for circuit interrupters to reliably disconnect from electrical power when a fault occurs, even if certain mechanical or electrical circuit interrupter components fail, for example, due to age or wear. Accordingly, it would be advantageous to provide a mechanical trip/reset assembly that is robust and stable when tripped. Preferably, such a robust assembly may be relatively simple and inexpensive to manufacture, and may lend itself to efficient circuit interrupter assembly and production flow. Accordingly, it would also be advantageous if such robust assembly substantially comprises a one or more modules that can be easily installed in interrupter devices, and/or includes instrumentalities to compensate for minor manufacturing inconsistencies.

It is also considered important for interrupter devices to self-test to ensure proper functioning. It may be particularly advantageous for circuit interrupters to automatically self-test prior after a fault is detected and prior to resetting back to a power-on mode.

SUMMARY

The present disclosure provides a description of apparatuses, systems, and methods to address the perceived needs and desires described above.

In one example, a sliding block module is provided. The sliding block module may include a block seat, a sliding block, and a first arm assembly. The sliding block may be at least partially disposed within the block seat, and may be configured to move vertically therein. The block seat and the first arm assembly may form a first hinge upon which the first arm assembly may rotate. The first arm assembly may include a first conductive component. The first arm assembly may be biased to rotate inwardly toward the block seat and the sliding block.

The sliding block module may further include a second arm assembly. The block seat and the second arm assembly may form a second hinge upon which the second arm assembly may rotate. The second arm assembly may include a second conductive component. The second arm assembly may be biased to rotate inwardly toward the block seat and the sliding block.

The sliding block may further include a first inclined side, a second inclined side, a central bore, and/or a latch recess. The latch recess may intersect with the central bore and may be configured to receive a latch. The first arm assembly may be configured to push the first inclined side downward. The second arm assembly may be configured to push the second inclined side downward.

The block seat further may further include a first hinge pin, a second hinge pin, a front protrusion, and/or a plurality of sliding block guide elements. The first arm assembly may further include at least a first hinge clamp. The second arm assembly may further include a second hinge clamp. The first hinge may include the first hinge pin and the first hinge clamp. The second hinge may include the second hinge pin and the second hinge clamp. The plurality of sliding block guide elements may be configured to limit the horizontal and rotational movement of the sliding block with respect to the block seat.

The first arm assembly may further include a first torsion spring. The first torsion spring may bias the first arm assembly to rotate inwardly toward the block seat and the sliding block. The second arm assembly may further include a second torsion spring. The second torsion spring may bias the second arm assembly to rotate inwardly toward the block seat and the sliding block.

The first arm assembly may further include a first block guiding arm and a first arm assembly spring. The first arm assembly spring may be disposed between the first block guiding arm and the first conductive and may bias at least a portion of the first conductive element away from the sliding block. The second arm assembly may further include a second block guiding arm and a second arm assembly spring. The second arm assembly spring may be disposed between the second block guiding arm and the second conductive element and may bias at least a portion of the second conductive element away from the sliding block.

The first conductive element may be snap fit into the first block guiding arm. The second conductive element may be snap fit into the second block guiding arm.

The first torsion spring may be snap fit into both the first arm assembly and the block seat. The second torsion spring may be snap fit into both the second arm assembly and the block seat.

The first conductive element may include a first front electrical contact and a first back electrical contact. The first front electrical contact and the first back electrical contact may be disposed on a side of the first conductive element opposite from the first arm assembly spring. The second conductive element may include a second front electrical contact and a second back electrical contact. The second front electrical contact and the second back electrical contact may be disposed on a side of the second conductive element opposite from the second arm assembly spring.

The block seat may include at least a first rotation stop configured to limit the rotational range of the first arm assembly. The block seat may include at least a second rotation stop configured to limit the rotational range of the second arm assembly.

The front protrusion of the sliding block may be configured to actuate a microswitch when the sliding block is in its downmost vertical position with respect to the block seat.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate certain embodiments of the present disclosure and together with the description, serve to explain the principles of this disclosure.

DETAILED DESCRIPTION

Reference will now be made in detail to the present exemplary embodiments, examples of which are illustrated in the accompanying drawings. Wherever possible, the same reference numbers will be used throughout the drawings to refer to the same or like parts. While the description includes exemplary embodiments, other embodiments are possible, and changes may be made to the embodiments described without departing from the spirit and scope of the invention. The following detailed description does not limit the invention. Instead, the scope of the invention is defined by the appended claims and their equivalents.

Sliding Block/Microswitch Assembly Components

Figure 4:
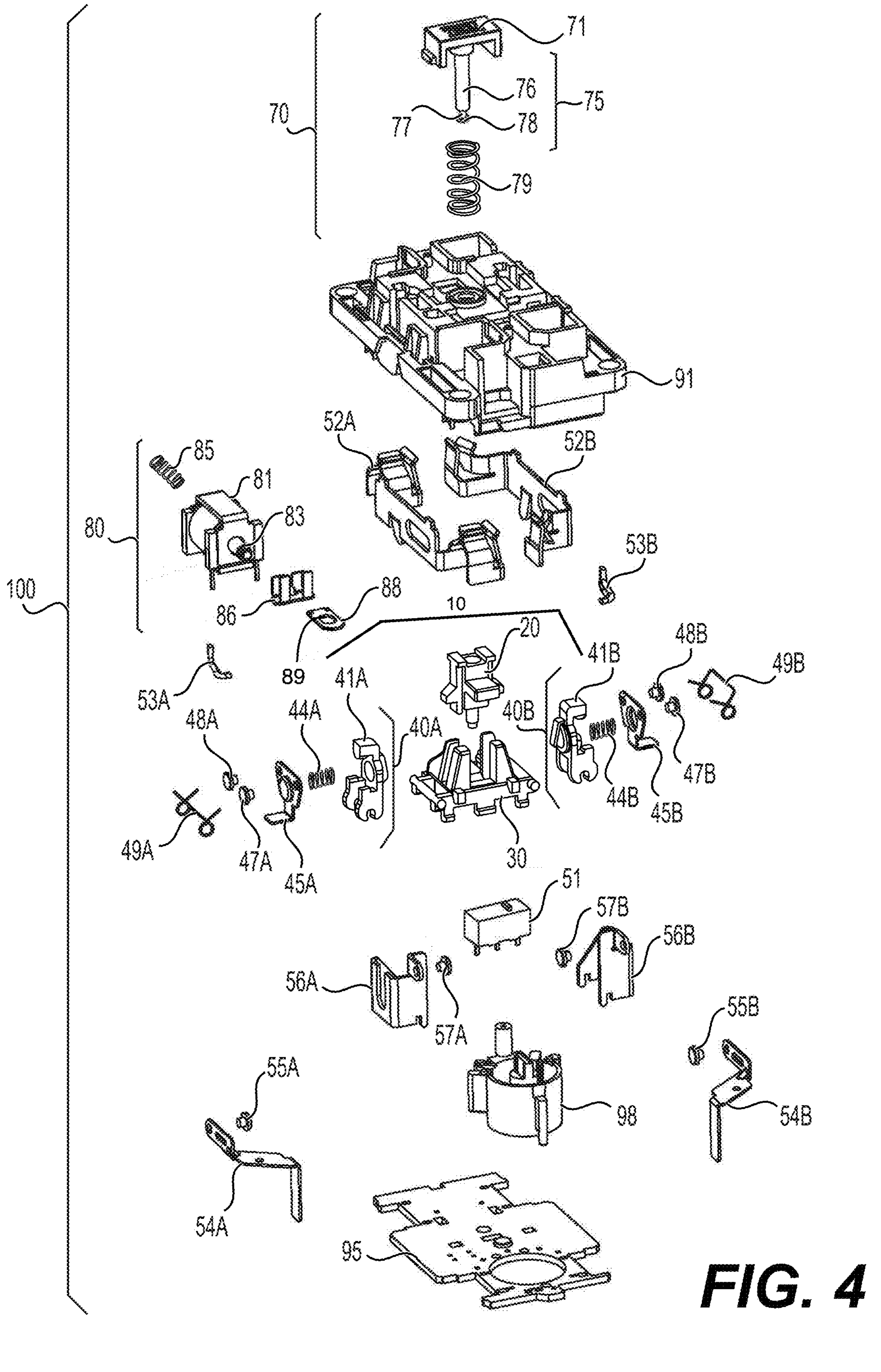
FIG. 4 is an exploded view of an embodiment of an exemplary sliding block/microswitch assembly, consistent with the present disclosure.

With reference to FIG. 4, an exploded view of an embodiment of sliding block/microswitch assembly 100 is provided. Sliding block/microswitch assembly 100 may comprise sliding block module 10, reset button assembly 70, trip coil assembly 80, circuit connection components 50, frame 91, microswitch 93, circuit board 95, and/or fault detection coil 98.

Figure 1:
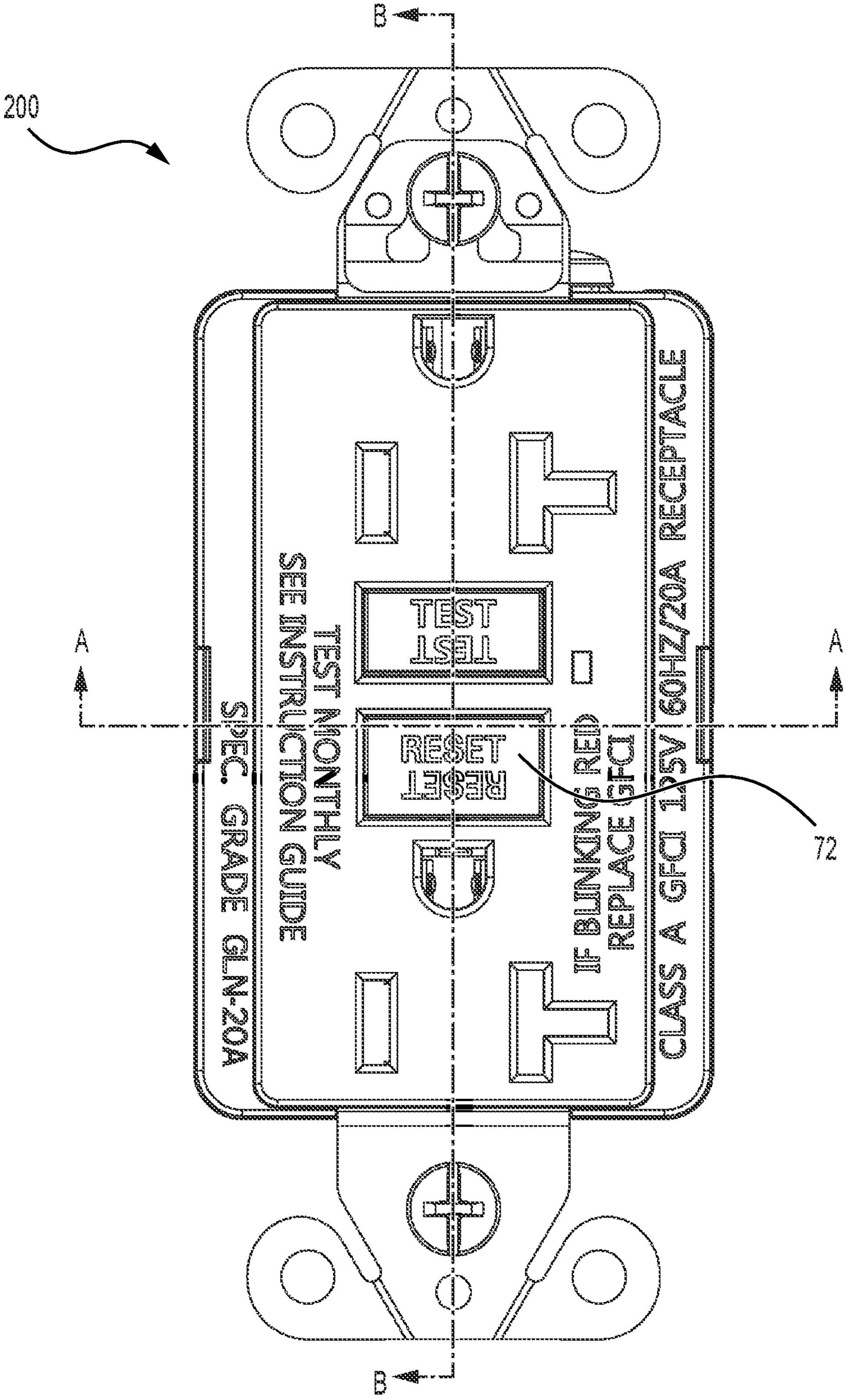
FIG. 1 is a front view of an embodiment of a circuit interrupter with an exemplary sliding block/microswitch assembly, consistent with the present disclosure.
Figure 2A:
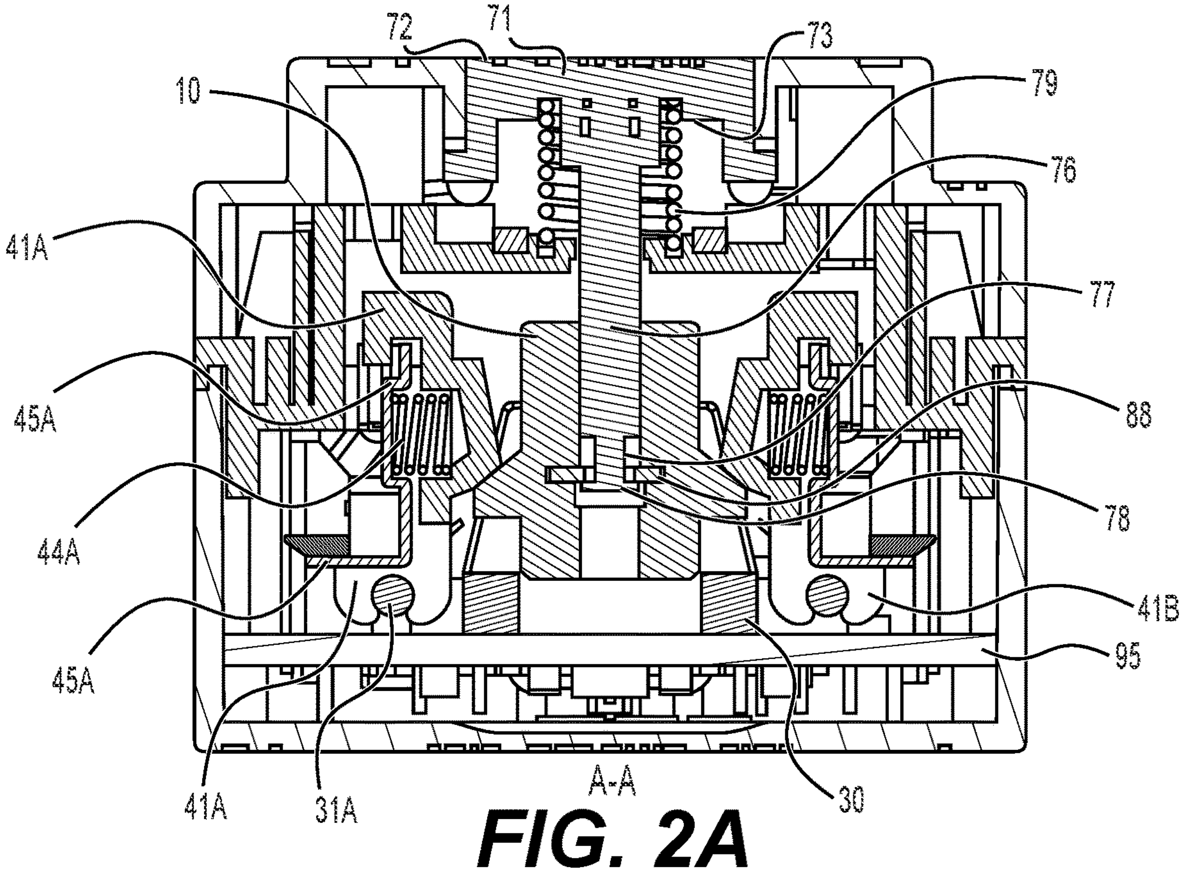
FIGS. 2A and 2B are cross-sectional views of the circuit interrupter of FIG. 1 taken at A-A, with the sliding block/microswitch assembly embodiment in a first and second position, respectively, consistent with the present disclosure.
Figure 2B:
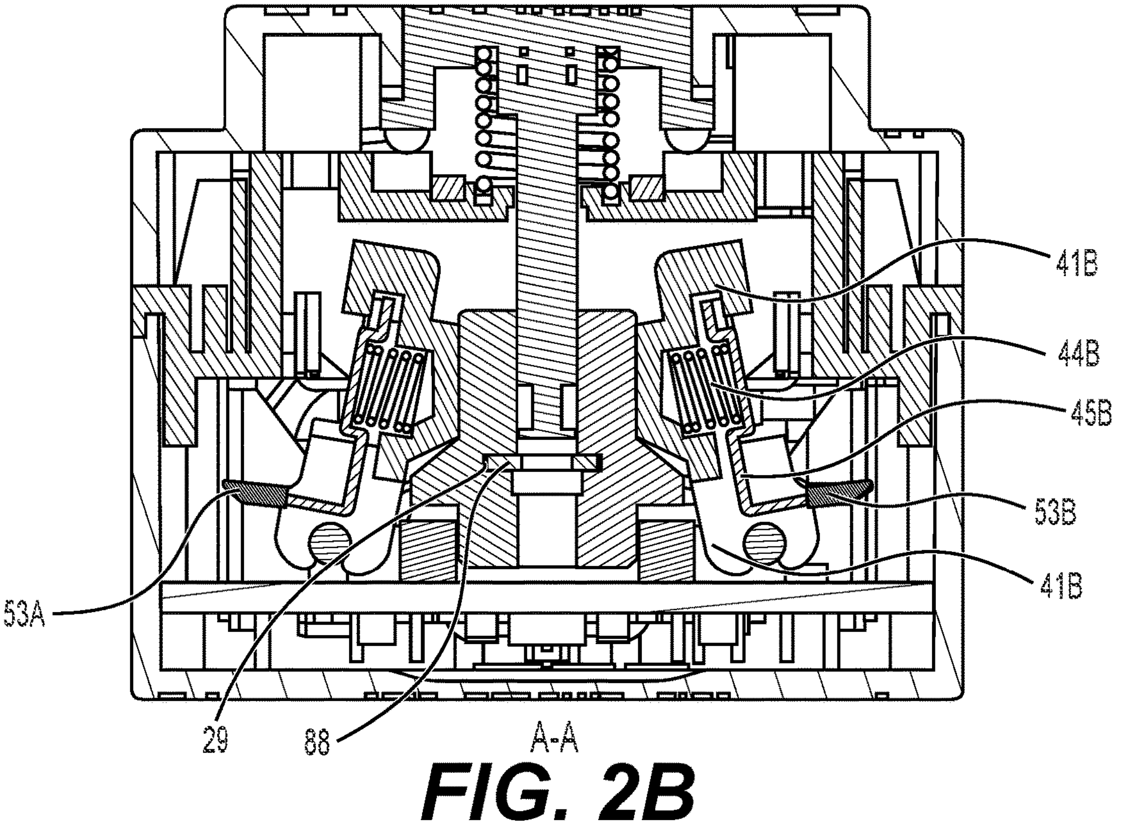
Figure 2C:
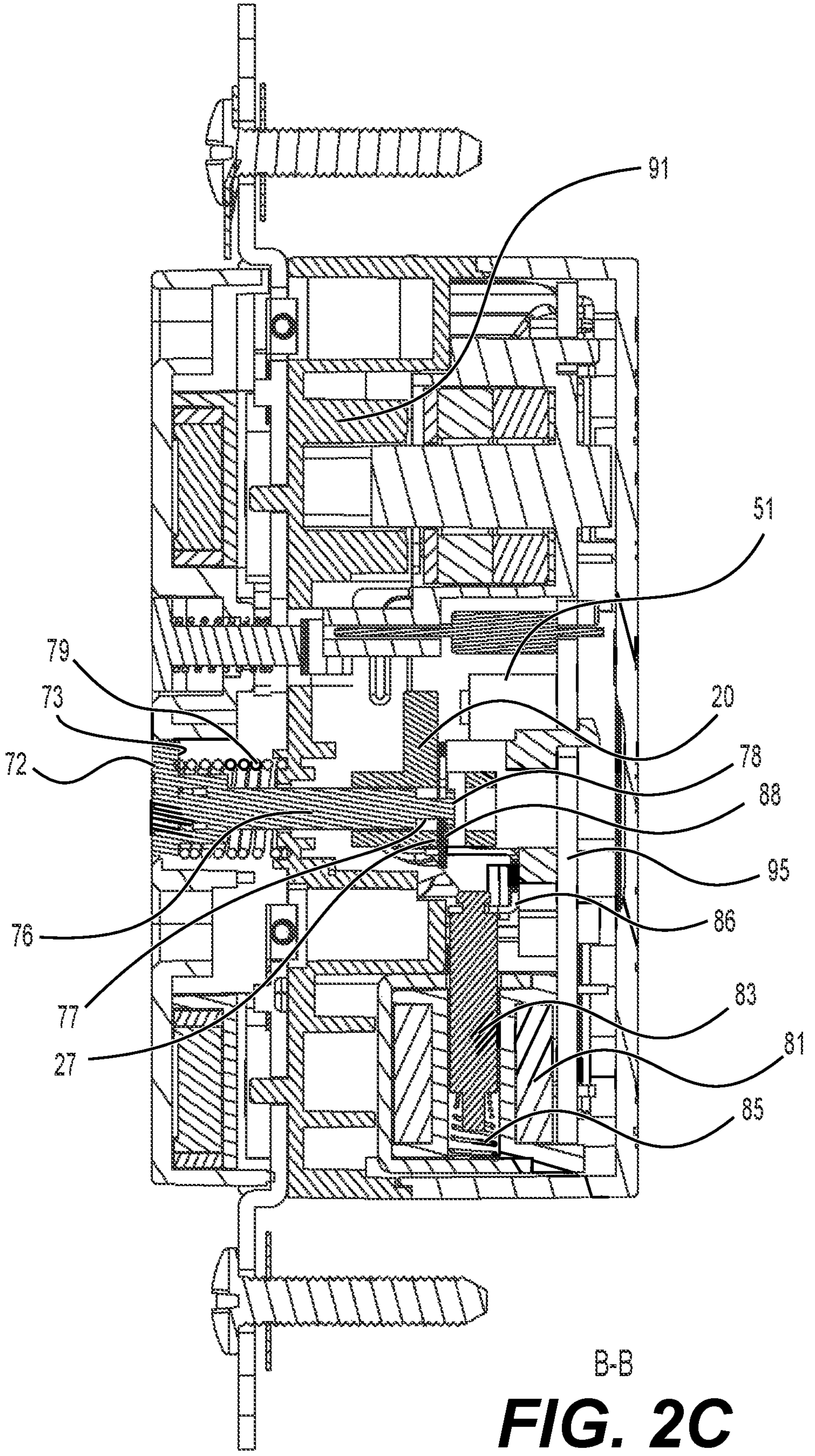
FIG. 2C is a cross-sectional views of the circuit interrupter of FIG. 1, taken at B-B, with the sliding block/microswitch assembly embodiment in the first position, consistent with the present disclosure.
Figure 3A:
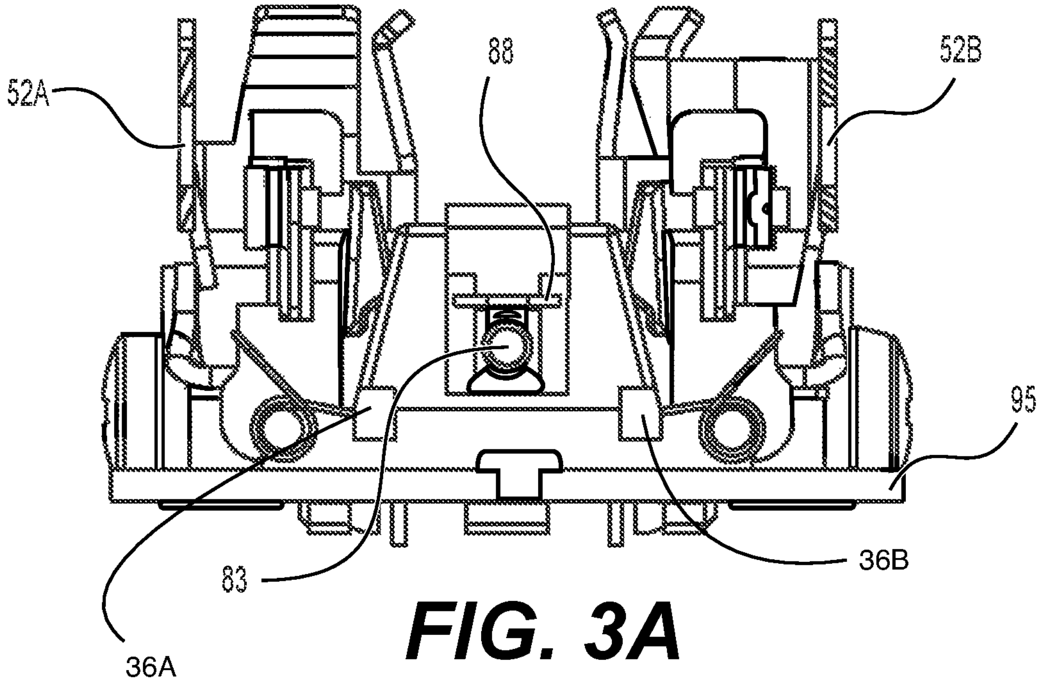
FIGS. 3A and 3B are partial cross-sectional views of the circuit interrupter of FIG. 1, with the sliding block/microswitch assembly in a first and second position, respectively, consistent with the present disclosure.
Figure 3B:
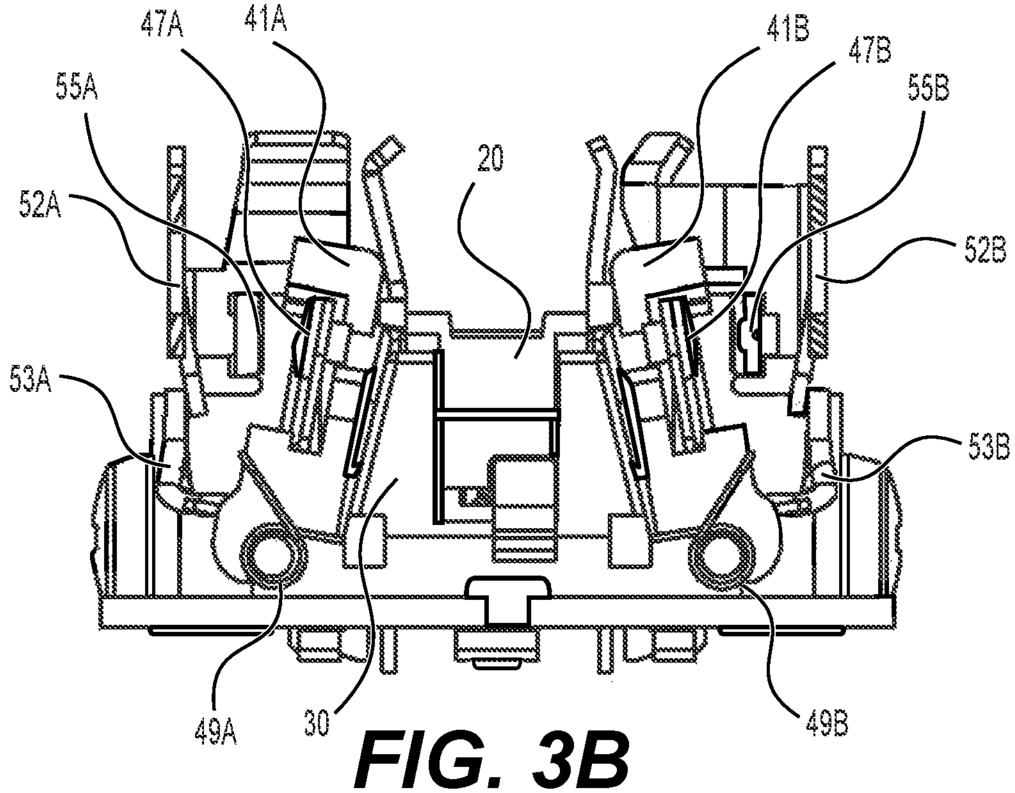
Figure 3C:
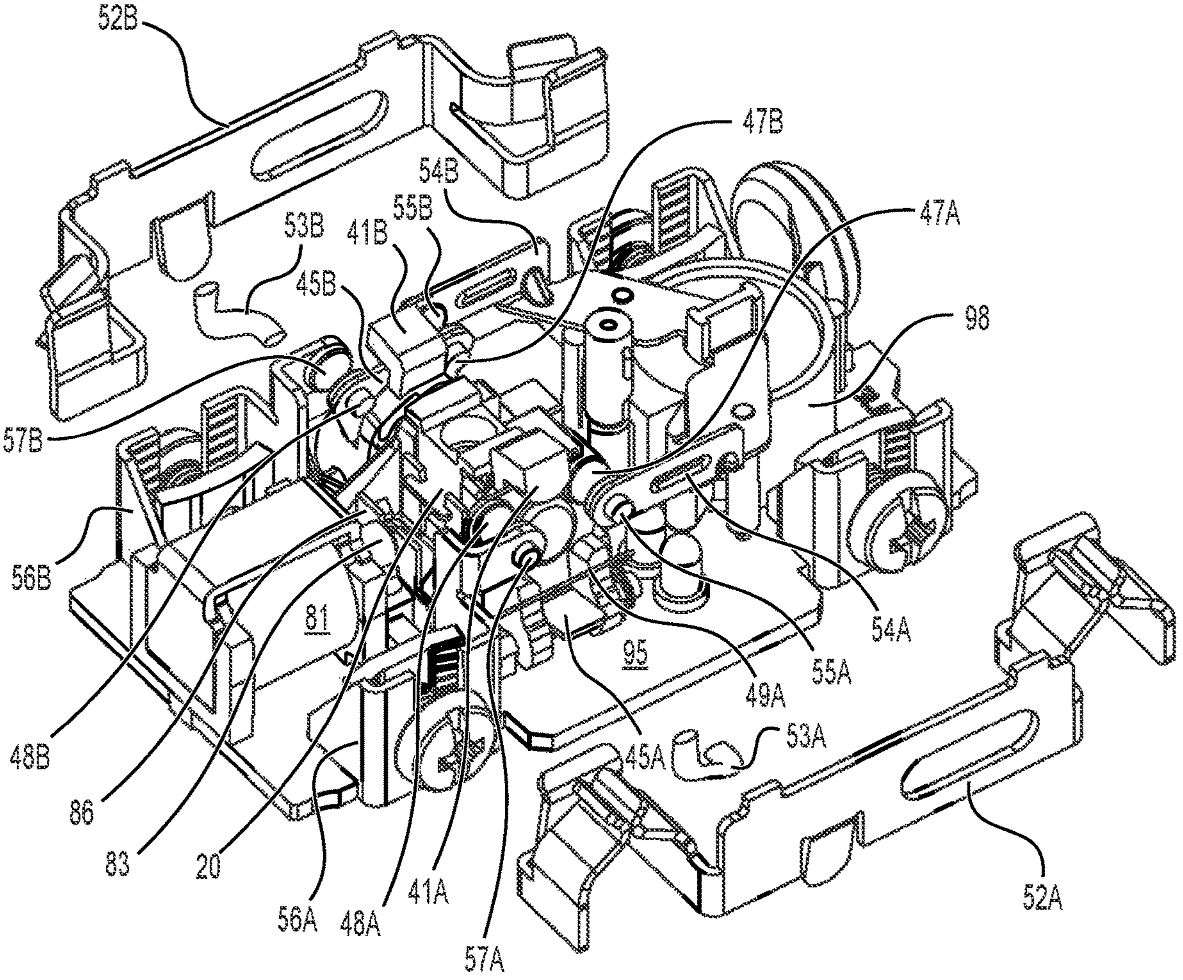
FIG. 3C is perspective, partially-exploded view of portions of the exemplary circuit interrupter of FIG. 1, consistent with the present disclosure.

Sliding block/microswitch assembly 100 may be assembled within circuit interrupter 200, which is depicted from various perspectives and in various states in FIGS. 1, 2A, 2B, 2C, 3A, 3B, and 3C. FIG. 1 depicts relevant portions of an exemplary circuit interrupter 200 from the front; FIGS. 2A and 2C depict cross-sectional views of the circuit interrupter 200 taken at A-A and B-B of FIG. 1, respectively, when the sliding block/microswitch assembly 100 is in a first position; FIG. 2B depicts cross-sectional views of the circuit interrupter 200 taken at A-A of FIG. 1, when the sliding block/microswitch assembly 100 is in a second position. FIGS. 3A and 3B depict partial cross-sectional views of the circuit interrupter 200, wherein the sliding block/microswitch assembly 100 is in the first position and second position, respectively. FIG. 3C depicts partially-exploded view of portions of circuit interrupter 200.

Although circuit interrupter 200 is depicted as an electrical outlet-circuit interrupter, this disclosure is not so limited; other forms of circuit interrupters known in the art, such as those intended for fuse box installation and inline cord interrupters, are also specifically contemplated.

Sliding block module 10 may comprise sliding block 20, block seat 30, and first and second arm assemblies 40A/40B.

Figure 5:
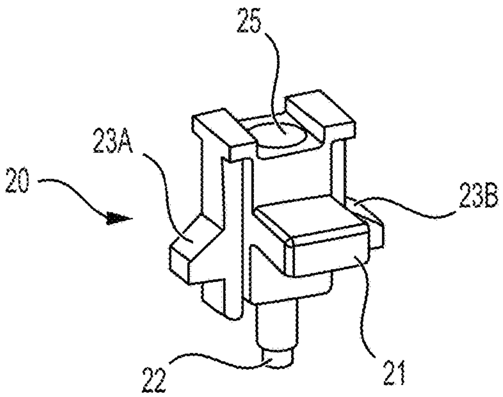
FIG. 5 is a detailed view of an embodiment of a sliding block of an exemplary sliding block/microswitch assembly, consistent with the present disclosure.

As may be observed in, for example, FIG. 5, sliding block 20 may comprise front protrusion 21, first and second inclined sides 23A/23B, and central bore 25. As may be observed in, for example, FIGS. 2B and 2C, sliding block 20 may further comprise latch recess 29 and latch access gap 27. In some embodiments, sliding block 20 may further include lower block extension 22.

Figure 6:
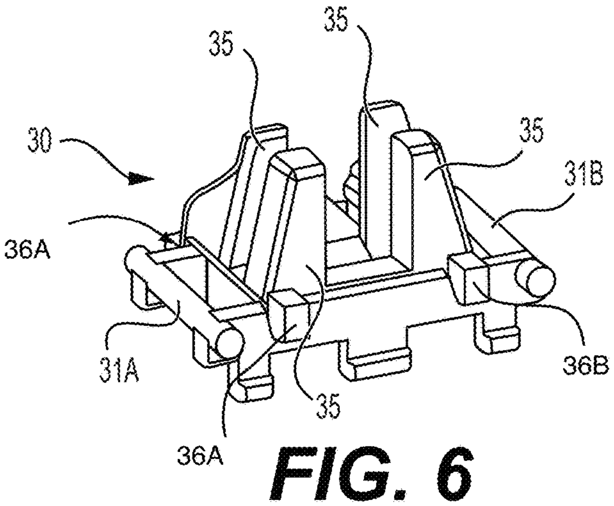
FIG. 6 is a detailed view of an embodiment of a block seat of an exemplary sliding block/microswitch assembly, consistent with the present disclosure.

As may be observed in, for example, FIG. 6, block seat 30 may comprise first and second hinge pins 31A/31B, first and second rotation stops 36A/36B, and a plurality of guide elements 35. Sliding block module 10 may be disposed within block seat 30 configured to vertically move therein. Guide elements 35 may be configured to prevent and/or minimize non-vertical movement of sliding block 20 within block seat 30 by limiting, and substantially preventing, the horizontal and rotational movement of front protrusion 21 and first and second inclined sides 23A/23B of sliding block module 10. As may be observed in, for example, FIGS. 3A-3C, block seat 30 may be securely affixed to circuit board 95 or another nonmoving component of assembly 100/interrupter 200 to prevent movement.

Figure 7A:
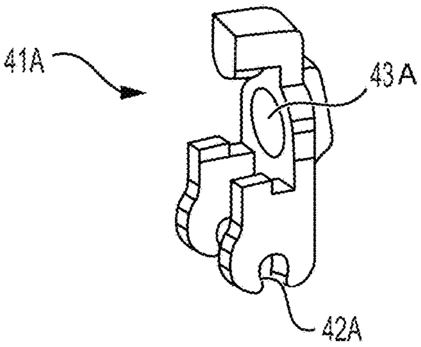
FIGS. 7A and 7B are detailed views of embodiments of block first and second block guiding arms of an exemplary sliding block/microswitch assembly, consistent with the present disclosure.

With reference to FIG. 4, first arm assembly 40A may comprise first block guiding arm 41A, first arm assembly spring 44A, first arm copper piece 45A, first arm front contact 47A, first arm back contact 48A, and first arm torsion spring 49A. With reference to FIG. 7A, first block guiding arm 41A may further comprise first guiding arm spring receiving surface 43A and first arm hinge clamps 42A.

As depicted, for example in FIGS. 2A and 2B, first guiding arm spring receiving surface 43A may be configured to receive first arm assembly spring 44A. The opposite end of first arm assembly spring 44A may abut first arm copper piece 45A. In this manner, first arm assembly spring 44A may bias the upper portion of first block guiding arm 41A away from the upper portion of first arm copper piece 45A and towards upper rod portion 76 and certain first side circuit connection components 50A (not identified in FIGS. 2A and 2B). This may ensure reliable electrical connections between the electrical contacts notwithstanding potential manufacturing inconsistencies. First arm copper piece 45A may be partially disposed within and/or at least loosely held by first block guiding arm 41A. However, in certain preferred embodiments first arm copper piece 45A may be snap fitted into first block guiding arm 41A. While first arm copper piece 45A may preferably consist of copper or a suitable copper alloy, it may, in alternative embodiments, additionally or alternatively comprise a conductor(s) other than copper.

With reference to FIG. 3C, first arm front contact 47A and first arm back contact 48A may be disposed upon the upper portion first arm copper piece 45A, facing away from sliding block/microswitch assembly 100. In certain embodiments, for example, with reference to FIG. 4, back pins of first arm front contact 47A and first arm back contact 48A, respectively, may be riveted into holes in the upper portion of first arm copper piece 45A.

With reference to, for example, FIGS. 2A and 2B, first arm hinge clamps 42A may be configured to engage with hinge pin 31A of block seat 30 to form a first hinge the permits the partial rotation of first block guiding arm 41A about hinge pin 31A. With reference to, for example, FIGS. 3A and 3B, first arm torsion spring 49A may be snap-fit, embedded, or otherwise attached to block seat 30 and may be biased to rotationally push first block guiding arm 41A against block seat 30 about the first hinge, until such rotation is halted by first rotation stop(s) 36A. With reference to, for example, FIG. 3C, first arm torsion spring 49A may abut and exert pressure on surfaces of first block guiding arm 41A above hinge clamps 42A. In some embodiments, first arm torsion spring 49A may be snap-fitted into the surfaces of first block guiding arm 41A. Ultimately, first arm torsion spring 49A may be biased to cause first block guiding arm 41A to abut and put pressure on inclined surface 23A of sliding block 20, thereby biasing sliding block 20 downward to its second position, for example as shown in FIGS. 2B and 3B.

Figure 7B:
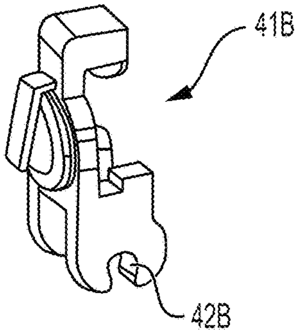

With reference to FIG. 4, second arm assembly 40B may comprise second block guiding arm 41B, second arm assembly spring 44B, second arm copper piece 45B, second arm front contact 47B, second arm back contact 48B, and second arm torsion spring 49B. With reference to FIG. 7B, second block guiding arm 41 second may further comprise second guiding arm spring receiving surface 43B (not shown) and second arm hinge clamps 42B.

As depicted, for example in FIGS. 2A and 2B, second guiding arm spring receiving surface 43B may be configured to receive second arm assembly spring 44B. The opposite end of second arm assembly spring 44B may abut second arm copper piece 45B. In this manner, second arm assembly spring 44B may bias the upper portion of second block guiding arm 41B away from the upper portion of second arm copper piece 45B and towards certain second side circuit connection components 50B. This may ensure reliable electrical connections between the electrical contacts notwithstanding potential manufacturing inconsistencies. Second arm copper piece 45B may be partially disposed within and/or at least loosely held by second block guiding arm 41B. However, in certain preferred embodiments second arm copper piece 45B may be snap fitted into second block guiding arm 41B. While second arm copper piece 45B may preferably consist of copper or a suitable copper alloy, it may, in alternative embodiments, additionally or alternatively comprise a conductor(s) other than copper, With reference to FIG. 3C, second arm front contact 47B and second arm back contact 48B may be disposed upon the upper portion second arm copper piece 45B, facing away from sliding block/microswitch assembly 100. In certain embodiments, for example, with reference to FIG. 4, back pins of second arm front contact 47B and second arm back contact 48B, respectively, may be riveted into holes in the upper portion of second arm copper piece 45B.

With reference to, for example, FIGS. 2A and 2B, second arm hinge clamps 42B may be configured to engage with hinge pin 31B of block seat 30 to form a second hinge the permits the partial rotation of second block guiding arm 41B about hinge pin 31B. With reference to, for example, FIGS. 3A and 3B, second arm torsion spring 49B may be snap-fit, embedded, or otherwise attached to block seat 30 and may be biased to rotationally push second block guiding arm 41B against block seat 30 about the second hinge, until such rotation is halted by second rotation stop(s) 36B. With reference to, for example, FIG. 3C, second arm torsion spring 49B may abut and exert pressure on surfaces of second block guiding arm 41B above hinge clamps 42B. In some embodiments, second arm torsion spring 49B may be snap-fitted into the surfaces of second block guiding arm 41B. Ultimately, second arm torsion spring 49B may be biased to cause second block guiding arm 41B to abut and put pressure on inclined surface 23B of sliding block 20, thereby biasing sliding block 20 downward to its second position, for example as shown in FIGS. 2B and 3B.

As depicted in, for example, FIGS. 4, 2A, 2B, and 2C, Reset button assembly 70 may comprise a reset button 71, reset rod 75 connected to reset button 71, and reset spring 79. Reset rod 15 may comprise upper rod portion 76, recessed rod portion 77, and bottom rod portion 78. Portions of reset rod 75, including portions of upper rod portion 76, all of recessed rod portion 77, and all of bottom rod portion 78, may be disposed within central bore 25 of sliding block 20, for example as shown in FIGS. 2A-2C. Disposed as such, reset rod 75 may be configured to move vertically with respect to sliding block 20.

Reset button 71 may be pressed by a user to place to circuit interrupter 200 into the normal operational (reset) state if interrupter 200 is in the tripped state and the tripping conditions have been resolved. Reset button 17 may comprise upper reset button surface 72, as shown in FIG. 1, which may be accessed by a user.

Reset button 71 may also comprise lower reset button surface 73, as shown in FIGS. 2A-2C, which may receive an upper end of reset spring 79. Reset spring 79 may physically push reset button 72 upward into its default position after a user presses and releases it. Reset spring 79 may be biased to pull the entire reset button assembly 70—and any engaged components—upwards. It is contemplated that the bias of reset spring 79 may be sufficient to overcome the bias(es) of torsion spring(s) 49A/49B. The lower end of reset spring 79 may be disposed on an upper surface of frame 91, or, alternatively, another stationary physical component of circuit interrupter 200.

As may best be observed in FIGS. 2C and 4, trip coil assembly 80 may comprise trip coil 81, trip iron core 83, trip coil spring 85, latch grip 86, and latch 88. Trip coil spring 85 may be disposed within trip coil 81 and abut trip iron core 83 such that, when trip coil 81 is not energized, trip coil spring 85 may push trip iron core 83 out of trip coil 81. The energizing of trip coil 81, for example via a signal from circuit components of interrupter 200, may generate an electro-magnetic field that is configured to pull trip iron core 83 back—against the force of trip coil 85—and further inside of trip coil 81.

An outer tip of trip iron core 83 may be engaged with latch grip 86. In turn, latch grip 86 may hold latch 88. Latch 88 may be disposed within latch recess 29 of sliding block 20. Latch 88 may move substantially perpendicular within sliding block 20 with respect to the permitted vertical movement of sliding block 20 as pushed and pulled by trip iron core 83 via latch grip 86. In some embodiments, latch grip 86 and/or latch 88 may be configured to move vertically with respect to the other components of trip coil assembly 80 to accommodate the vertical movement of latch 88 resulting from vertical movement of sliding block 20.

As may be best observed in FIG. 4, latch 88 may have a latch hole 89. Latch hole 89 may be of a sufficient diameter for bottom rod portion 78 to freely pass therethrough when the hole is substantially aligned within central bore 25 of sliding block 20. However, when passage through latch hole 89 is at least partially blocked by the walls defining central bore 25, bottom rod portion 78 may be preventing from passing therethrough. In this manner, latch 88 can engage with reset rod 75 by maintaining recessed portion 75 within latch hole 89, for example as shown in FIG. 2C.

In certain illustrated embodiments, latching may occur when the trip coil 81 is not energized, and trip iron core 83, trip latch 86, and latch 88 are pushed forward by trip coil spring 85. In such embodiments, when trip iron core 83 is energized—for example, via a trip signal from the circuitry of interrupter 200—trip iron core 83 is pulled by the electromagnetic force, overcoming the bias of trip coil spring 85. When trip iron core 83 is pulled, latch 88 is also pulled via latch grip 86. In turn, this may sufficiently align latch hole 89 with central bore 25, allowing bottom rod portion 78 to pass therethrough. When this occurs, the engagement is released (or engaged, in circumstances where the reset button assembly 70 is being pushed down by a user, discussed below). Without the engagement, the spring force provided by reset spring 79 is no longer applied to sliding block 20. Then, the downward force imparted by torsion spring(s) 49A/49B through block guiding arms 41A/41B to inclined sides 23A/23B of sliding block 20 may push sliding block downwards into the second position. Simultaneously, the rotation of the block guiding arms 41A/41B pulls copper pieces 45A/45B and their front and back contracts 47A/47B/48A/48B away from their corresponding electrical connections; this may ensure a stoppage of power through circuit interrupter 200.

In alternative embodiments, the latching mechanism may be reversed. That is, in such embodiments, latching may be maintained when trip coil 81 is energized and the engagement may be release when such operation signal ceases and trip coil spring 85 pushed latch 88 to sufficiently align latch hole 89 with central bore 25, allowing bottom rod portion 78 to pass therethrough. This alternative embodiment may be achieved by shifting the horizontal alignment of latch 88 with respect to sliding block 20.

In certain embodiments, microswitch 93 may be pressed only when a user fully depresses reset button 71. When this occurs, bottom rod portion 78 may contact and push against latch 88 without passing through latch hole 89, thereby push sliding block 20 to its bottom-most position, which may be referred to herein as a third position. (In alternative embodiments, the third position may be obtained by having bottom rod portion 78 contact and push against a bottom surface of or withing central bore 25.) In the third position, a lower surface of front protrusion 21 may press microswitch 93. Such engagement of microswitch 51 may best be visualized with reference to FIG. 2C. It may further be noted that the due to rotation stops 36A/36B of block seat 30, arm assemblies 40A/40B may be prevented from pushing sliding block 20 to the third position. In this manner, the third position, wherein microswitch 93 is pressed, may only be achieved by a user's physically pressing reset button 21 all the way down.

It is further contemplated that in some alternative embodiments (not shown), lower block extension 22 of sliding block 20 may include a spring or be configured to engage with a spring (for example on the other side of circuit board 95) biased to push sliding block 20 to the second position from the third position when a user is no longer fully pressing reset button 71. In yet other embodiments, lower block extension 22 may be configured extend through circuit board 95 to, for example, further prevent horizontal movement of sliding block 20 and/or actuate a microswitch 93 disposed in an alternative location.

Circuit connections 50 may include first side circuit connections 50A and second side circuit connections 50B. In certain embodiments, first side circuit connections 50A may generally corresponding to neutral power and second side circuit connections 50B may generally correspond to hot power. However, this disclosure is not so limited and in alternative embodiments, the polarities may be reversed.

As may best be viewed in FIG. 3C, first side circuit connections 50A may include first outlet slots 52A, first copper piece weld 53A, first detection coil connector 54A, first detection coil contact 55A, first power connector 56A, and first power contact 57A. First outlet slots 52A may be configured to receive one side of electrical plug(s) inserted into interrupter 200, for example, the neutral plug blades. First outlet slots 52A may connected to first copper piece 45A via first copper piece weld 53A. First detection coil connector 54A may be connected to fault detection coil 98, for example at the neutral input side, and may by physically and electrically connected with first detection coil contact 55A. First detection coil contact 55A may preferably be riveted to first detection coil connector 54A. First power connector 56A may be connected to live power, for example, the live neutral input of interrupter 200, and may by physically and electrically connected with first power contact 57A. First power contact 57A may preferably be riveted to first power connector 56A.

When sliding block/microswitch assembly 100 is in the first position, first front contact 48A may abut and electrically connect with first power contact 57A and first back contact 47A may abut and electrically connect with first detection coil contact 55A. Correspondingly, first power connector 56A, first outlet slots 52A, and first detection coil connector 54A may become one node via first copper piece 45A. This may bring line-in power, such as neutral power, to the corresponding outlet side and to the corresponding side of fault detection coil 98.

When sliding block/microswitch assembly 100 is in the second position (or third position), first front contact 48A may be disconnected with first power contact 57A and first back contact 47A may be disconnected connected with first detection coil contact 55A. Correspondingly, first power connector 56A, first outlet slots 52A, and first detection coil connector 54A may be three separate nodes. This ensures that line-in power, such as neutral power, may not be provided to the corresponding outlet side and may not be provided to the corresponding side of fault detection coil 98.

Similarly, second side circuit connections 50B may include second outlet slots 52B, second copper piece weld 53B, second detection coil connector 54B, second detection coil contact 55B, second power connector 56B, and second power contact 57 second. Second outlet slots 52 second may be configured to receive one side of electrical plugs using interrupter 200, for example the hot plug blades. Second outlet slots 52B may connected to second copper piece 45B via second copper piece weld 53B. Second detection coil connector 54B may be connected to fault detection coil 98, for example at the hot input side, and may by physically and electrically connected with second detection coil contact 55B. Second detection coil contact 55B may preferably be riveted to first detection coil connector 54B. Second power connector 56B may be connected to live power, for example, the live hot input of interrupter 200, and may by physically and electrically connected with second power contact 57B. Second power contact 57B may preferably be riveted to second power connector 56B.

When sliding block/microswitch assembly 100 is in the first position, second front contact 48B may abut and electrically connect with second power contact 57B and second back contact 47B may abut and electrically connect with second detection coil contact 55B. Correspondingly, second power connector 56B, second outlet slots 52B, and second detection coil connector 54B may become one node via second copper piece 45B. This may bring line-in power, such as hot power, to the corresponding outlet side and to the corresponding side of fault detection coil 98.

When sliding block/microswitch assembly 100 is in the second position (or third position), second front contact 48B may be disconnected from second power contact 57B and second back contact 47B may be disconnected connected with second detection coil contact 55B. Correspondingly, second power connector 56B, second outlet slots 52B, and second detection coil connector 54B may be three separate nodes. This ensures that line-in power, such as hot power, may not be provided to the corresponding outlet side and may not be provided to the corresponding side of fault detection coil 98.

Sliding Block/Microswitch Assembly Operation—Tripping

In a normal (reset) operational state of circuit interrupt 200, sliding block/microswitch assembly 100 may be in the first position, as depicted in for example, FIGS. 2A, 2C, and 3A.

The circuit interrupter 200 circuitry may detect a fault, for example, a leakage current detected from fault detection coil 98, and arc current, a component failure, miswiring, and/or the like. (It should be noted that while, for purposes of illustration, element 98 may be configured to detect leakage currents or ground faults, this disclosure is not so limited. It is contemplated that fault detection coil 98 may detect other types of faults and may, is some alternative embodiments, not comprise a coil or may comprise multiple coils.) Upon detecting a fault, circuit interrupter 200 circuitry may provide a trip signal to trip coil 81, causing trip iron core 83 to be pulled in against the bias of trip coil spring 85. In turn latch grip 86 and latch 88 may be pulled, causing latch hole 89 to be at least temporarily aligned with central bore 25 of sliding block 20. Such alignment may permit bottom reset rod portion 78 to pass through latch hole 89. Under the force of reset spring 79, this may disengage latch 88 from reset button assembly 70 and, in turn, may disengage sliding block 20 from reset button assembly 70.

Without the indirect upward bias from reset spring 79 on sliding block 20, arm assemblies 40A/40B may rotate inwardly around the first and second hinges under the force of torsion springs 49A/49B until such rotation is blocked by rotation stops 36A/36B. Accordingly, sliding block 20 may be pushed down to the second position, as illustrated in, for example, FIGS. 2B and 3B. The inward rotation of arm assemblies 40A/40B may break the electrical connections between first and second front contracts 47A/47B and first and second detection coil contacts 55A/55B, respectively, removing power from detection coil 98; it may simultaneously break the electrical connections between first and second back contacts 48A/48B and first and second power contacts 57A/57B, respectively, removing power from the electrical outlets of circuit interrupter 200. The tripped interrupter 200 is thereby powered off in a secure manner. The powered off outlet may be physically maintained in this second position until it is successfully reset.

Upon ceasing of the trip signal, trip iron core 83 may be pushed out again by trip iron coil spring 85. In turn, latch 88 may be extended through latch recess 29 sufficient to block portions of latch hole 89 with the walls defining central bore 25. However, because reset rod 75 may be in a raised position at this juncture, as illustrated in, for example, FIG. 2B, no re-engagement between reset rod 75 and latch 88 or sliding block 20 may occur due to the return of latch 88 to this default position.

Sliding Block/Microswitch Assembly Operation—Resetting

Resetting a tripped circuit interrupter 200 with a sliding block/microswitch assembly 100 may proceed with a user pressing reset button 71 all the way down, causing reset button assembly 70 to proceed downward. Because upon cessation of the trip signal, trip iron coil spring 85 may have pushed latch 88 back through latch recess 29 sufficient to block portions of latch hole 89 with the walls defining central bore 25 (via trip iron core 83 and latch grip 86), bottom rod portion 78 may be unable to pass through latch hole 89. Accordingly, the downward pressure on reset button assembly 70 may be transferred to sliding block 20 via latch 88. Sliding block 20 may thereby be pushed all the way down and into the third position where sliding block 20 may actuate microswitch 93 via, for example, the bottom surface of front protrusion 21 (or, for example, the lower block extension 22 in alternative embodiments referenced above).

Actuation of the microswitch may, in preferred embodiments, initiate a self-test of the circuit interrupter. In some embodiments, the self-test may engage an analogy leakage signal test circuit, or other self-test known in the art. In alternative embodiments, the self-test may be omitted or may comprise multiple self-tests.

If the self-test is passed (or omitted), the circuit interrupter 200 circuitry may provide a resetting signal to trip coil 81, causing trip iron core 83 to be pulled in against the bias of trip coil spring 85. In turn, this will pull in latch grip 86 and latch 88 to at least momentarily align latch hole 89 with central bore 25 sufficient to permit bottom rod portion 78 to pass through latch hole 89 under pressure from the user's press of reset button 71. In various embodiments, such signal may be maintained for a certain amount of time and/or until microswitch 93 is released.

The user may then release reset button 71, permitting reset button assembly 70 to travel upward under the force of reset spring 79, and releasing the pressure on microswitch 93. Under the force provided by trip iron core 83, latch hole 89 may be moved sufficient to prevent bottom rod portion 78 from passing back through latch hole 89; in this manner, latch 88 may be reengaged with reset button assembly 70, which may be correspondingly reengaged with sliding block 20. Under the pressure of reset spring 79, sliding block 20 may be pulled upward, causing arm assemblies 40A/40B to be rotated outwardly notwithstanding the weaker countervailing force of torsion springs 49A/49B.

The outward rotation of arm assemblies 40A/40B may reconnect the first and second front contracts 47A/47B with first and second detection coil contacts 55A/55B, respectively, providing power from detection coil 98; it may simultaneously reconnect first and second back contacts 48A/48B with first and second power contacts 57A/57B, respectively, providing power from the electrical outlets of circuit interrupter 200. The tripped interrupter 200 may thereby be returned to a powered -n normal working state, with sliding block/microswitch assembly 100 returned to the first position.

In the preceding specification, various preferred embodiments have been described with reference to the accompanying drawings. It will, however, be evident that various other modifications and changes may be made thereto, and additional embodiments may also be implemented, without departing from the broader scope of the invention as set forth in the claims that follow.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

We claim:

1. A sliding block module, comprising:
a block seat;
a sliding block;
a first arm assembly;
wherein,
the sliding block is disposed at least partially within the block seat, and configured to move vertically therein;
the block seat and the first arm assembly form at least a first hinge upon which the first arm assembly rotates;
the first arm assembly comprises a first conductive component; and
the first arm assembly is biased to rotate inwardly toward the block seat and the sliding block.

2. The sliding block module of claim 1, further comprising:
a second arm assembly;
wherein,
the block seat and the second arm assembly form at least a second hinge upon which the second arm assembly rotates;
the second arm assembly comprises a second conductive component; and
the second arm assembly is biased to rotate inwardly toward the block seat and the sliding block.

3. The sliding block module of claim 2, wherein the sliding block comprises:
a first inclined side;
a second inclined side;
a central bore; and
a latch recess,
wherein:
the latch recess intersects with the central bore and is configured to receive a latch;
the first arm assembly is configured to push the first inclined side downward; and
the second arm assembly is configured to push the second inclined side downward.

4. The sliding block module of claim 2, wherein:
the block seat further comprises a first hinge pin, a second hinge pin, a front protrusion, and a plurality of sliding block guide elements;
the first arm assembly further comprises at least a first hinge clamp;
the second arm assembly further comprises at least a second hinge clamp;
the at least a first hinge comprises the first hinge pin and the at least a first hinge clamp;
the at least a second hinge comprises the second hinge pin and the at least a second hinge clamp; and
the plurality of sliding block guide elements are configured to limit the horizontal and rotational movement of the sliding block with respect to the block seat.

5. The sliding block module of claim 4, wherein:
the first arm assembly further comprises a first torsion spring;
the first torsion spring biases the first arm assembly to rotate inwardly toward the block seat and the sliding block;
the second arm assembly further comprises a second torsion spring; and
the second torsion spring biases the second arm assembly to rotate inwardly toward the block seat and the sliding block.

6. The sliding block module of claim 5, wherein:
the first arm assembly further comprises a first block guiding arm and a first arm assembly spring;
the first arm assembly spring is disposed between the first block guiding arm and the first conductive component and biases at least a portion of the first conductive component away from the sliding block;
the second arm assembly further comprises a second block guiding arm and a second arm assembly spring; and
the second arm assembly spring is disposed between the second block guiding arm and the second conductive component and biases at least a portion of the second conductive component away from the sliding block.

7. The sliding block module of claim 6, wherein:
the first conductive component is snap fit into the first block guiding arm; and
the second conductive component is snap fit into the second block guiding arm.

8. The sliding block module of claim 6, wherein:
the first conductive component comprises a first front electrical contact and a first back electrical contact;
the first front electrical contact and the first back electrical contact are disposed on a side of the first conductive component opposite from the first arm assembly spring;
the second conductive component comprises a second front electrical contact and a second back electrical contact; and
the second front electrical contact and the second back electrical contact are disposed on a side of the second conductive component opposite from the second arm assembly spring.

9. The sliding block module of claim 5, wherein:

the first torsion spring is snap fit into both the first arm assembly and the block seat; and the second torsion spring is snap fit into both the second arm assembly and the block seat.

10. The sliding block module of claim 5, wherein:

the block seat includes at least a first rotation stop configured to limit the rotational range of the first arm assembly; and the block seat includes at least a second rotation stop configured to limit the rotational range of the second arm assembly.

11. The sliding block module of claim 4, wherein:

the front protrusion is configured to actuate a microswitch when the sliding block is in its downmost vertical position with respect to the block seat.

12. The sliding block module of claim 1, wherein the sliding block comprises:

a first inclined side;

a central bore;

a front protrusion; and a latch recess, wherein:

the latch recess intersects with the central bore and is configured to receive a latch; and the first arm assembly is configured to push the first inclined side downward.

13. The sliding block module of claim 1, wherein:

the block seat further comprises a first hinge pin, a front protrusion, and a plurality of sliding block guide elements;

the first arm assembly further comprises a first hinge clamp;

the at least a first hinge comprises the first hinge pin and the first hinge clamp; and the plurality of sliding block guide elements are configured to limit the horizontal and rotational movement of the sliding block with respect to the block seat.

14. The sliding block module of claim 13, wherein:

the first arm assembly further comprises a first torsion spring; and the first torsion spring biases the first arm assembly to rotate inwardly toward the block seat and the sliding block.

15. The sliding block module of claim 14, wherein:

the first arm assembly further comprises a first block guiding arm and a first arm assembly spring; and the first arm assembly spring is disposed between the first block guiding arm and the first conductive component and biases at least a portion of the first conductive component away from the sliding block.

16. The sliding block module of claim 15, wherein:

the first conductive component is snap fit into the first block guiding arm.

17. The sliding block module of claim 15, wherein:

the first conductive component comprises a first front electrical contact and a first back electrical contact; and the first front electrical contact and the first back electrical contact are disposed on a side of the first conductive component opposite from the first arm assembly spring.

18. The sliding block module of claim 14, wherein:

the first torsion spring is snap fit into both the first arm assembly and the block seat.

19. The sliding block module of claim 14, wherein:

the block seat includes at least a first rotation stop configured to limit the rotational range of the first arm assembly.

20. The sliding block module of claim 13, wherein:

the front protrusion is configured to actuate a microswitch when the sliding block is in its downmost vertical position with respect to the block seat.

* * * * *